Patented Aug. 29, 1944

2,356,745

UNITED STATES PATENT OFFICE 2,356,745

POLYHYDRIC ALCOHOL ESTERS

Robert H. Barth, Rochelle Park, and Harry Burrell, Clifton, N. J., assignors, by mesne assignment, to Heyden Chemical Corporation, New York, N. Y., a corporation of Delaware No Drawing. Application February 8, 1941, Serial No. 378,052

8 Claims. (Cl. 260—488)

This invention relates to complete and partial esters of pentaerythritol and related compounds useful in the plastics and coatings arts as modifiers.

It is an object of the invention to prepare substances compatible with a wide variety of resins and cellulose derivatives and which serve to plasticize, soften, elasticize, lubricate, and otherwise modify these plastics. The resulting compositions may be molded under pressure, dissolved in solvents to form coating compositions, extruded to form ribbons, fibers, or structural shapes, emulsified or otherwise prepared to be used as textile assistants, and so forth.

The esters of this invention may be used with cellulose nitrate, cellulose acetate, cellulose acetobutyrate and other cellulose esters, ethyl cellulose, methyl cellulose, benzyl cellulose and other cellulose ethers, damar, manila, rosin, ester gum, and other natural resins, polystyrene, polyvinyl esters and acetals, chlorinated rubber, phenol-formaldehyde, urea- or melamine-formaldehyde and other synthetic resins, castor oil, triacetin, tricresyl phosphate, dibutyl phthalate and other plasticizers if necessary, and with or without such solvents, pigments or fillers as may be desirable.

The plasticizers may be incorporated with these ingredients according to methods well known in the art, as for example by dissolving in a mutual solvent and subsequently evaporating the solvent, by kneading at an elevated temperature, if desired, and conveniently in a machine of the Banbury mixer type, by milling on differential rolls, and so forth.

The acetate and the propionate of pentaerythritol have been described in the literature and are not claimed as coming within the scope of this invention. Because these materials are solids, because they are water sensitive, and for other reasons, their use has been limited. We have found, however, that mixed esters of two different short chain fatty acids are highly desirable as modifying agents, and these will be pointed out, and other objects of the invention will be indicated. These new mixed esters show greater stability to hydrolysis than the simple esters described in earlier literature. They show a greater range of compatibilities with various resins, and the resulting resin compositions have improved physical properties.

In the manufacture of pentaerythritol by the condensation of acetaldehyde and formaldehyde, in addition to the pentaerythritol itself, smaller amounts of related hydroxylated substances are also obtained. One of these obtained in a considerable amount is dipentaerythritol, which is an ether of the following structure:

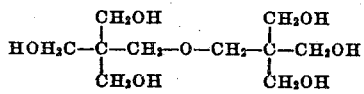

(See Brun, "Über den Dipentaerythritol," Wilhelm Greven, Krefeld, 1930.) Another related hydroxylated substance, obtained in somewhat smaller amounts, is white and crystalline, melts at 230–240° C. and has a hydroxyl content of 33%. It is related to dipentaerythritol in that it contains pentaerythritol residues bound by ether linkages. Regardless of chemical structure, for purposes of definition in this specification and in the claims, this substance will be termed pleopentaerythritol.

According to the best evidence available, pleopentaerythritol is probably a mixture of dipentaerythritol, tripentaerythritol, and possibly additional related alcohols.

Dipentaerythritol, tripentaerythritol, and pleopentaerythritol may be grouped together under the generic term "polypentaerythritols", by which term is meant those compounds of higher molecular weight than pentaerythritol which are formed either actually or theoretically by etherifying one or more of the hydroxyl groups of pentaerythritol with other pentaerythritol residues.

The normal esters of pentaerythritol and the polypentaerythritols may be formed by using methods long known in the art, such as heating them with acids or anhydrides, with or without a catalyst, under conditions favorable to the removal of water. Other esters such as mixed esters, hydroxy esters, and acetal-esters may be conveniently prepared according to the methods illustrated in the examples.

Among the acids suitable for esterifying pentaerythritol and polypentaerythritols may be mentioned acetic, propionic and butyric.

Mixed esters such as pentaerythritol diacetate dipropionate, pentaerythritol diacetate dibutyrate, dipentaerythritol diacetate dipropionate dibutyrate, dipentaerythritol triacetate tripropionate, etc., are excellent plasticizers. They are compatible with a wide variety of plastic and film forming materials, are liquids with low solidification points, are substantially colorless and odorless, and are very stable.

The following examples are intended as illustrative only and should not be so construed as to limit the invention as to scope or proportions. Parts are by weight.

*Example 1.*—When a mixture of pentaerythritol and a pentaerythritol tetraester is heated in the presence of an alkaline catalyst such as anhydrous potassium carbonate, an alcoholysis of the ester occurs. Thus when one molecular equivalent of pentaerythritol and one molecular equivalent of pentaerythritol tetraacetate, mp. 82°, were heated with a small amount (e. g., 0.1%) of potassium carbonate at 150° C. for two to four hours, new products were formed which contained both hydroxyl and acetate groups. When this material was vacuum distilled at 2 mm., pentaerythritol diacetate, B. P. 207–215, was obtained as the major product. Similarly, if one mol of pentaerythritol and three mols of the tetraacetate are heated with the catalyst and distilled under a vacuum of 2 mm., a new mono hydroxy triacetate compound of pentaerythritol is formed, B. P. 176–182° C. Similarly, there have been made hydroxy acetates of dipentaerythritol and hydroxy propionates of pentaerythritol. Some of these can be distilled while other are too high boiling. The monoacetate of pentaerythritol has not been distilled although it has been made by this process. The hydroxy esters are claimed in our application Serial No. 447,782, filed as a continuation-in-part of this case.

*Example 2.*—Mixed esters may be formed from the products of Example 1 by heating the hydroxy esters under reflux with an acid chloride or anhydride of an acid different from that used to provide the ester groups in the hydroxy ester. Typical mixed esters prepared in this fashion are listed in the following table.

are excellent. The molding material softened quickly, and flowed easily and well. The molded piece was glass clear, well formed, and glossy.

*Example 5.*—The following formula illustrates the compositions of lacquers which may be made up using the plasticizers of this invention.

|  | Parts |
|---|---|
| Cellulose acetate (low viscosity lacquer type) | 20 |
| Pentaerythritol diacetate dipropionate | 10 |
| Methyl ethyl ketone | 37 |
| Acetone | 15 |
| Diacetone alcohol | 15 |

The versatility and wide applicability of the mixed esters of pentaerythritol and of polypentaerythritols is evidenced in the foregoing examples. Many modifications of these esters are possible and the various permutations and combinations of mixed esters may easily be arranged to fill a specific need by one skilled in the art, by following the general and specific methods given. The mixed esters having a long chain fatty acid radical and a short chain fatty acid radical, originally disclosed in this application, are claimed in application Serial No. 505,944, filed as a continuation-in-part of this case.

Having thus described our invention, what we claim as new and desire to secure by Letters Patent is:

1. A composition of matter composed essentially of an ester of a polyhydric alcohol selected from the group consisting of pentaerythritol, polypentaerythritols and mixtures thereof, in which substantially all of the hydroxyl groups have been esterified by saturated organic short chain acid radicals, certain of said hydroxyl groups being esterified by one variety of said short chain acid radicals and the others by a different variety of said short chain acid radicals.

2. A composition of matter composed essentially of an ester of a polypentaerythritol in which substantially all of the hydroxyl groups have been esterified by saturated organic short chain acid radicals, certain of said hydroxyl groups being esterified by one variety of said short chain

*Table*

| Compound | Calculated mol weight | Starting hydroxy ester | Physical properties |
|---|---|---|---|
| Pentaerythritol triacetate monopropionate | 318 | Pentaerythritol triacetate | B. P. 162–164 @ 2 mm. |
| Pentaerythritol diacetate dipropionate | 332 | Pentaerythritol diacetate | B. P. 173–180 @ 2 mm. |
| Dipentaerythritol triacetate tripropionate | 548 | Dipentaerythritol triacetate | Viscous liquid. |
| Pentaerythritol diacetate dibutyrate | 360 | Dipentaerythritol diacetate | B. P. 160–165 @ 2 mm. |

*Example 3.*—When one molecular equivalent of pentaerythritol and 2 or more molecular equivalents each of the anhydrides of acetic and propionic acid were refluxed together, both acid groups entered the molecule in such a way that 90% of the product was pentaerythritol diacetate dipropionate, B. P. 173–180 at 2–3 mm.

*Example 4.*—Molding compositions were prepared by mixing 150 parts of a 33.3% solution of cellulose acetate (equivalent to 50 parts on a dry basis) with 5.5 parts of the pentaerythritol diacetate dipropionate as a plasticizer. The volatile solvent was allowed to evaporate and the hard, horny residue was comminuted. The resulting molding compositions were hot pressed at 175° C. at 2000 lb. per sq. in. pressure. The die was chilled before ejecting the piece. The molding properties of the composition mentioned above acid radicals and the others by a different variety of said short chain acid radicals.

3. A composition of matter composed essentially of a polyhydric alcohol selected from the group consisting of pentaerythritol, polypentaerythritols, and mixtures thereof in which certain of the hydroxyl groups have been esterified by acetate radicals and substantially all of the other hydroxyl groups have been esterified by propionate radicals.

4. A composition of matter composed essentially of an ester of a polypentaerythritol in which certain of the hydroxyl groups have been esterified by acetate radicals and substantially all of the other hydroxyl groups have been esterified by propionate radicals.

5. A composition of matter composed essentially of a diacetate dipropionate of pentaerythritol.

6. A composition of matter composed essentially of a triacetate tripropionate of dipentaerythritol.

7. A composition of matter composed essentially of an ester of a polyhydric alcohol selected from the group consisting of pentaerythritol, polypentaerythritols, and mixtures thereof in which certain of the hydroxyl groups have been esterified by acetate radicals and substantially all of the other hydroxyl groups have been esterified by butyrate radicals.

8. A composition of matter composed essentially of an ester of a polypentaerythritol in which certain of the hydroxyl groups have been esterified by acetate radicals and substantially all of the other hydroxyl groups have been esterified by butyrate radicals.

ROBERT H. BARTH.
HARRY BURRELL.